United States Patent [19]
Smith

[11] Patent Number: 5,303,535
[45] Date of Patent: Apr. 19, 1994

[54] LAWN MOWER BLADE AND INSERT CONSTRUCTION

[76] Inventor: Joseph L. Smith, Rt. 4, Box 502, Mocksville, N.C. 27028

[21] Appl. No.: 48,311

[22] Filed: Apr. 19, 1993

[51] Int. Cl.⁵ .............................................. A01D 34/82
[52] U.S. Cl. ........................................ 56/255; 56/295; 56/DIG. 17
[58] Field of Search ........ 56/255, 295, 17.5, DIG. 17, 56/DIG. 20

[56] References Cited

U.S. PATENT DOCUMENTS

| | | | |
|---|---|---|---|
| 3,665,692 | 5/1972 | Hughes | 56/295 |
| 4,594,843 | 6/1986 | Andersson et al. | 56/295 |
| 4,651,510 | 3/1987 | Malutich | 56/295 |
| 4,750,320 | 6/1988 | Liebl | 56/295 |
| 4,779,407 | 10/1988 | Pattee | 56/295 |
| 4,922,698 | 5/1990 | Taylor | 56/295 |
| 5,036,654 | 8/1991 | Matutich | 56/255 |

Primary Examiner—Terry Lee Melius
Attorney, Agent, or Firm—Leon Gilden

[57] ABSTRACT

A lawn mower blade includes support flanges projecting orthogonally relative to the first and second ends of the lawn mower blade arranged to mount blade inserts below each support flange, wherein each blade insert is arranged to project beyond a side wall spaced from the support flange.

2 Claims, 5 Drawing Sheets

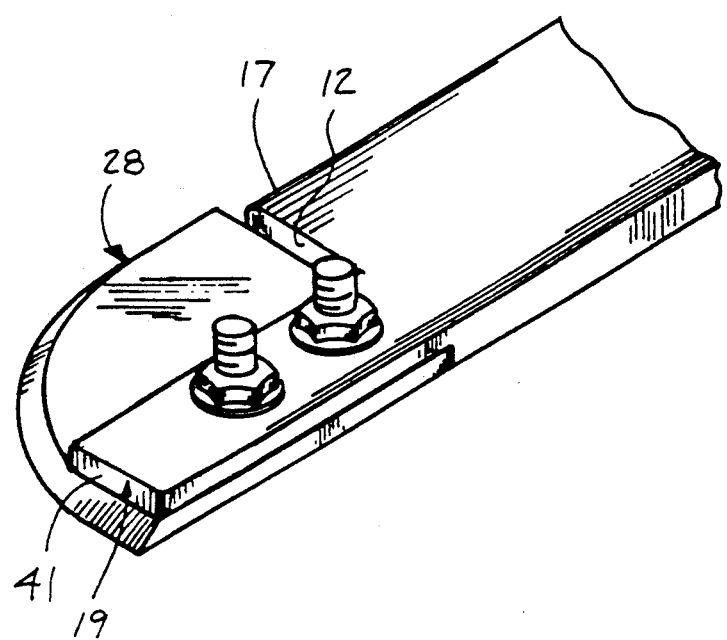
FIG. 6
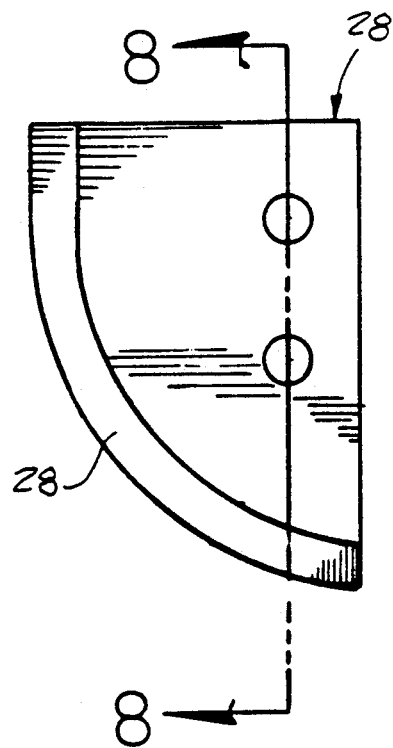
FIG. 8  FIG. 7

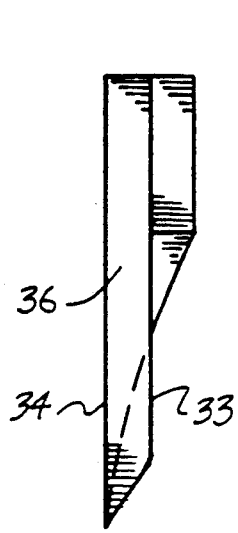
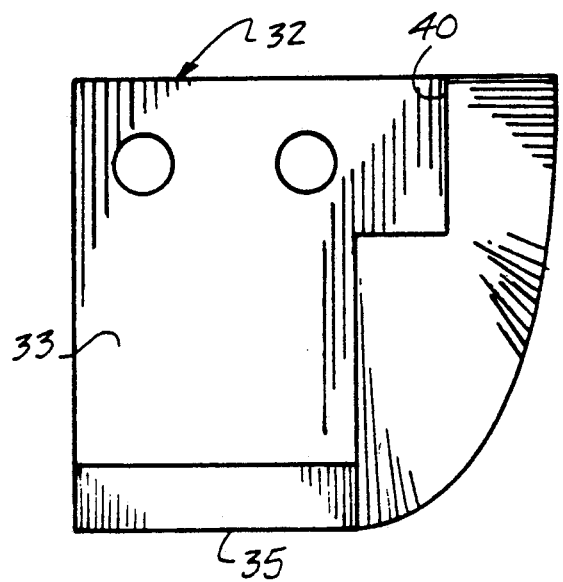
FIG. 11            FIG. 12
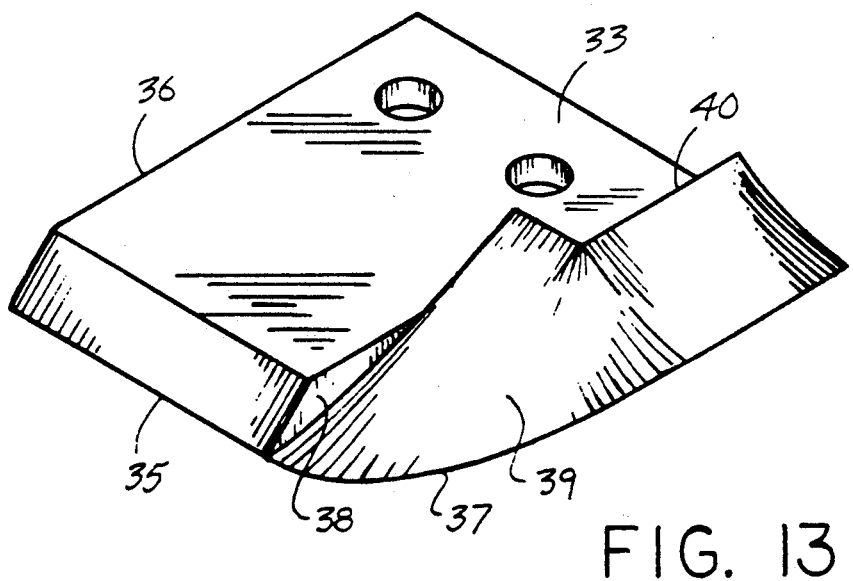
FIG. 13

LAWN MOWER BLADE AND INSERT CONSTRUCTION

BACKGROUND OF THE INVENTION

1. Field of the Invention

The field of invention relates to lawn mower blade construction, and more particularly pertains to a new and improved lawn mower blade and insert construction wherein the same is arranged to provide for replaceable inserts mounted within lawn mower blades.

2. Description of the Prior Art

Lawn mower blades having removable inserts to permit the economy and ease of the use of inserts of greater efficiency is available in the prior art such as indicated in U.S. Pat. Nos. 5,036,654; 4,750,320; 4,651,510; 4,779,407; and 4,594,843.

The instant invention attempts to overcome deficiencies of the prior art by providing for an insert construction arranged for ease of mounting and efficiency of construction relative to a lawn mower blade and in this respect, the present invention substantially fulfills this need.

SUMMARY OF THE INVENTION

In view of the foregoing disadvantages inherent in the known types of lawn mower blade and insert constructions now present in the prior art, the present invention provides a lawn mower blade and insert construction wherein the same is arranged to include an improved mounting flange construction arranged to provide for mounting of a lawn mower blade insert of enhanced efficiency in a cutting procedure. As such, the general purpose of the present invention, which will be described subsequently in greater detail, is to provide a new and improved lawn mower blade and insert construction which has all the advantages of the prior art lawn mower blade and insert constructions and none of the disadvantages.

To attain this, the present invention provides a lawn mower blade including support flanges projecting orthogonally relative to the first and second ends of the lawn mower blade arranged to mount blade inserts below each support flange, wherein each blade insert is arranged to project beyond a side wall spaced from the support flange.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended thereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawn mower blade and insert construction which has all the advantages of the prior art lawn mower blade and insert construction and none of the disadvantages.

It is another object of the present invention to provide a new and improved lawn mower blade and insert constructions which may be easily and efficiently manufactured and marketed.

It is a further object of the present invention to provide a new and improved lawn mower blade and insert constructions which is of a durable and reliable construction.

An even further object of the present invention is to provide a new and improved lawn mower blade and insert constructions which is susceptible of a low cost of manufacture with regard to both materials and labor, and which accordingly is then susceptible of low prices of sale to the consuming public, thereby making such lawn mower blade and insert constructions economically available to the buying public.

Still yet another object of the present invention is to provide a new and improved lawn mower blade and insert construction which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of a modified blade member.

FIG. 7 is an orthographic top view of the modified blade member.

FIG. 8 is an orthographic view, taken along the lines 8—8 of FIG. 7 in the direction indicated by the arrows.

FIG. 11 is an orthographic side view of a further modified blade member.

FIG. 12 is an orthographic top view of the further modified blade member, as indicated in FIG. 11.

FIG. 13 is an isometric illustration of the further modified blade member, as indicated in the FIGS. 11 and 12 for use by the blade plate of the invention.

DESCRIPTION OF THE PREFERRED EMBODIMENT

Figure 1:
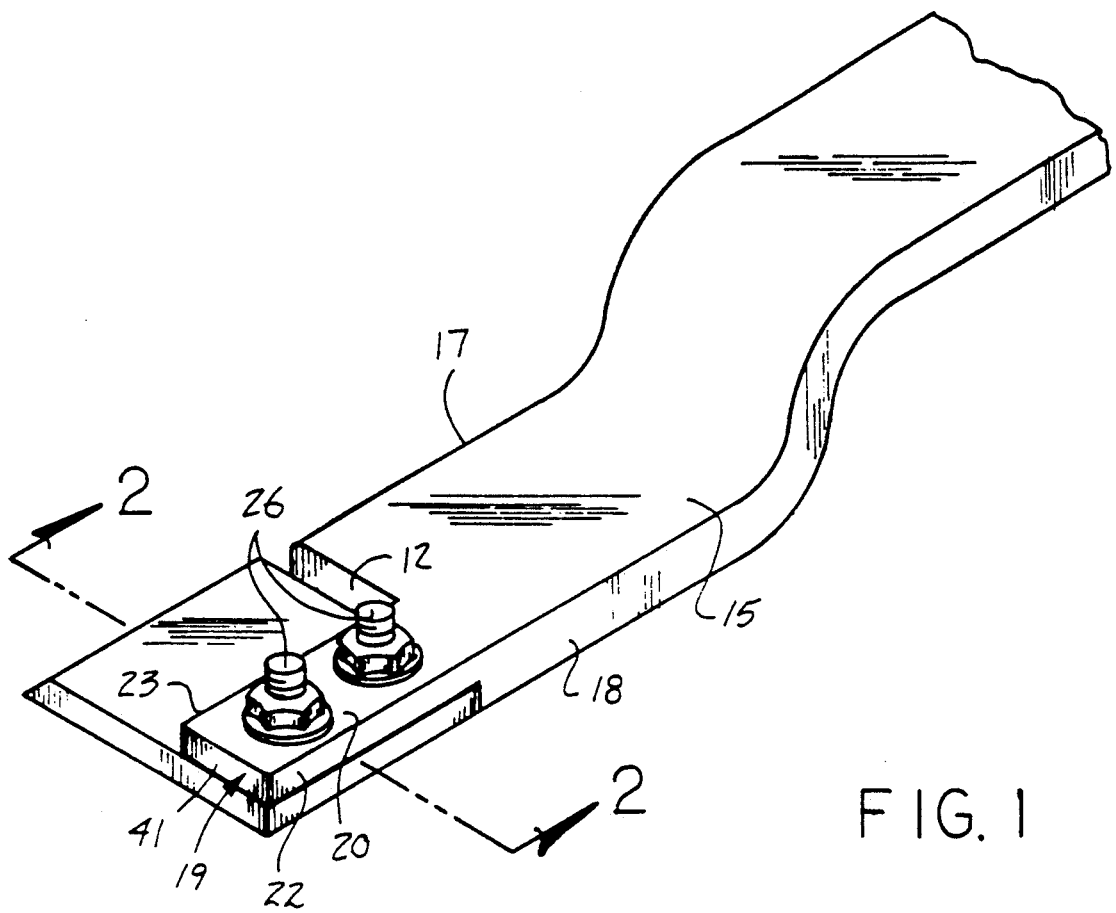
FIG. 1 is a partial isometric view of the invention.
Figure 2:
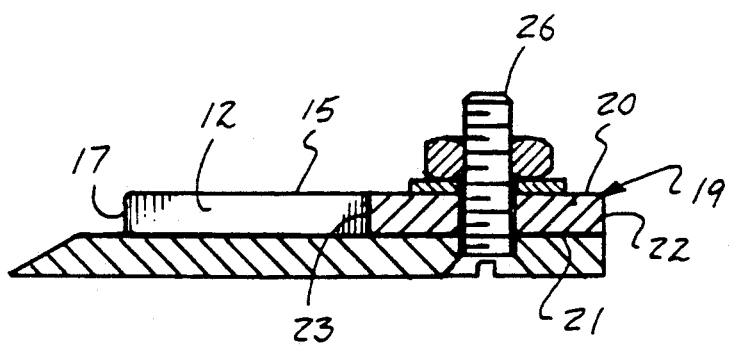
FIG. 2 is an orthographic view, taken along the lines 2—2 of FIG. 1 in the direction indicated by the arrows.
Figure 3:
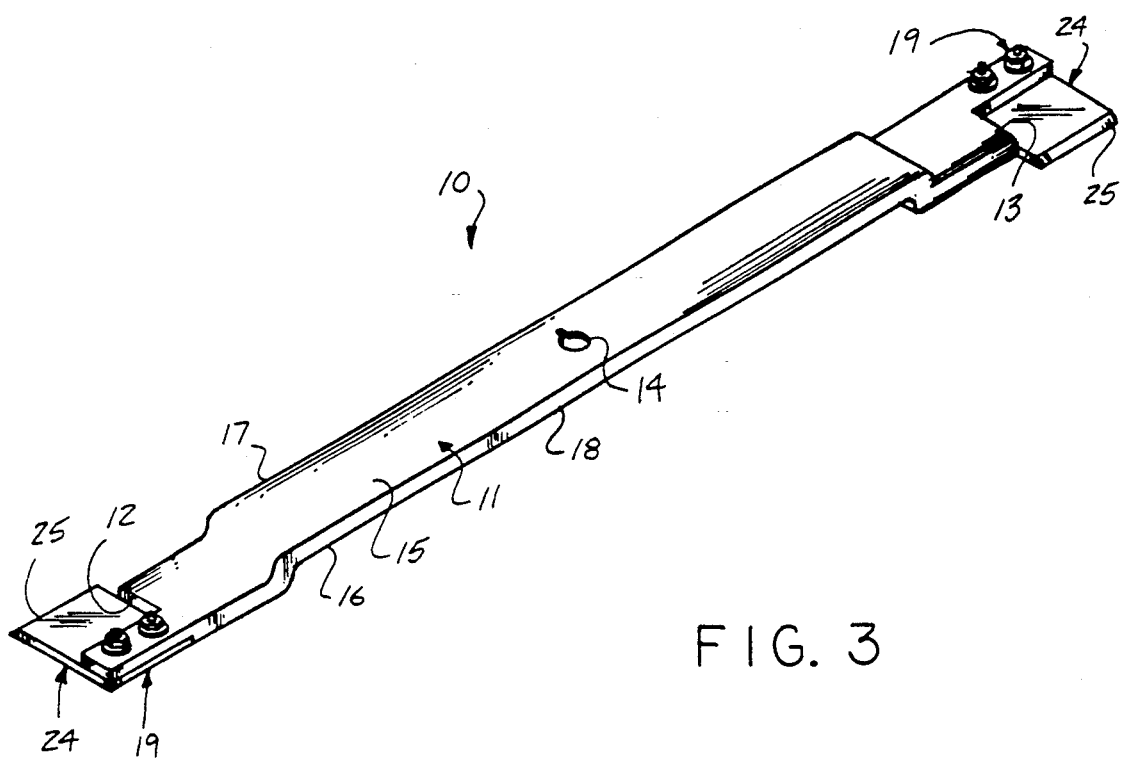
FIG. 3 is an isometric illustration of the blade construction of the invention.
Figure 4:
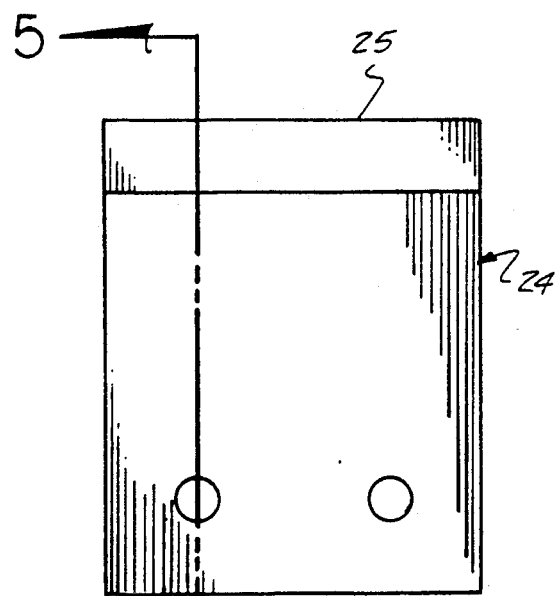
FIG. 4 is a top orthographic view of the blade insert.
Figure 5:
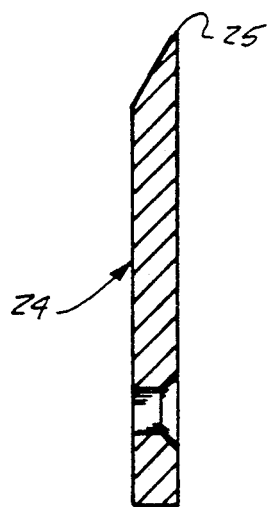
FIG. 5 is an orthographic view, taken along the lines 5—5 of FIG. 4 in the direction indicated by the arrows.

With reference now to the drawings, and in particular to FIGS. 1 to 13 thereof, a new and improved lawn mower blade and insert construction embodying the principles and concepts of the present invention and generally designated by the reference numeral 10 will be described.

More specifically, the lawn mower blade and insert construction 10 of the instant invention essentially comprises an elongate blade plate 11 (see FIG. 3), having a first end wall 12 spaced from and parallel a second end wall 13, and a blade top wall 15 spaced from a blade bottom wall 16 defining a first predetermined thickness. The blade includes a first side wall 17 spaced from a second side wall 18, and a mounting bore 14 orthogonally directed through the top wall 15 and the bottom wall 16 medially of the blade plate, and at least one support flange 19 mounted to the first end wall 12, having a support flange top wall 14 spaced from a support flange bottom wall 21 defining a second predetermined thickness less than said first predetermined thickness, and a support flange first side wall 22 arranged in a coplanar relationship to the second side wall 18, and a support flange second side wall 23 spaced from the first side wall 17, with the second side wall 18 orthogonally intersecting the blade plate first end wall 12 in an orthogonal relationship intermediate the support flange first side wall 22 and the blade first side wall 17, and a blade insert 24 having an insert top wall spaced from an insert bottom wall, wherein the insert top wall is mounted to the support flange bottom wall 21 and extends form the support flange bottom wall to the blade bottom wall, with the insert bottom wall coplanar with the blade bottom wall. Mounting fasteners 26 directed through the blade insert 24 and support flange 19 secure the insert 24 and support flange insert 24 together.

The FIGS. 6-8 indicate the use of a modified blade insert 28 having an arcuate cutting edge 29 that extends from the support flange end wall 41 in a continuous arc subtending ninety degrees to the blade plate first end wall 12, as illustrated, and mounted between the support flange bottom wall 21 to a coplanar relationship relative to the blade bottom wall 16, as illustrated in FIG. 6 for example.

Figure 9:
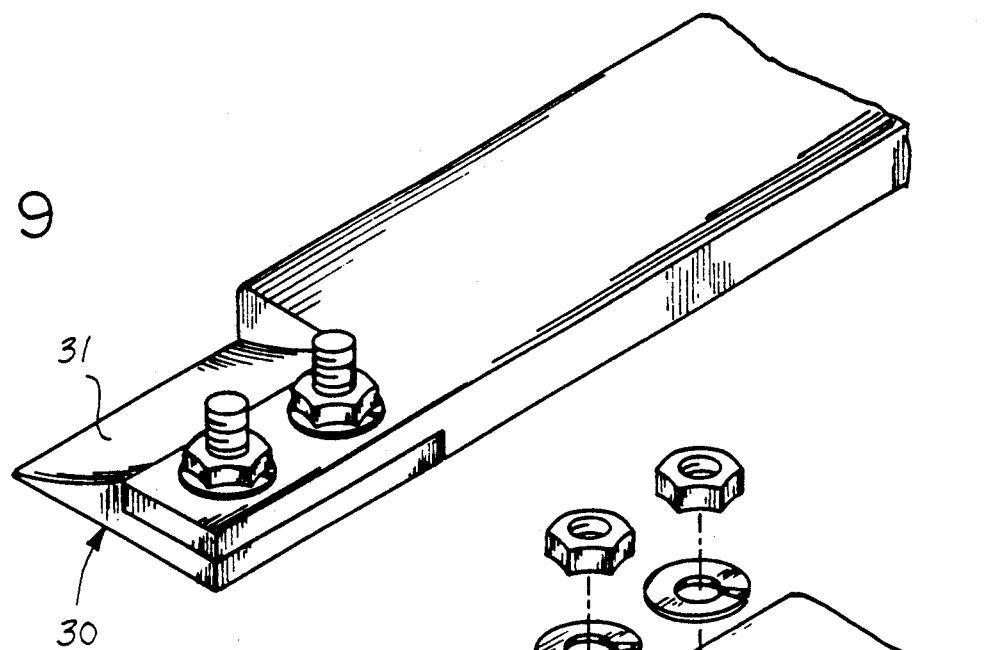
FIG. 9 is an isometric illustration of a yet further modified blade member.
Figure 10:
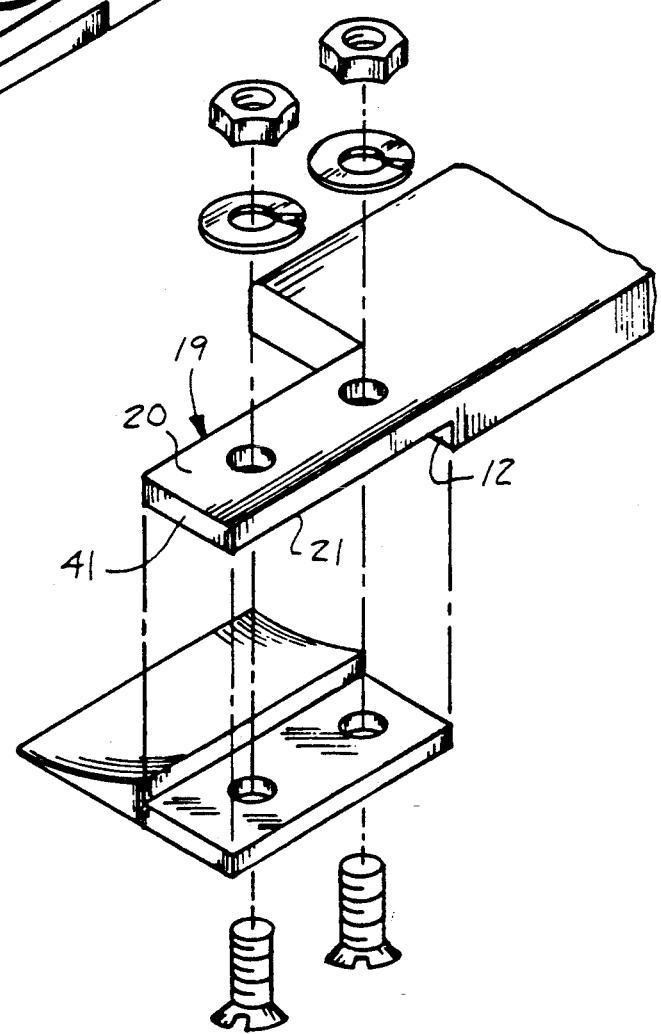
FIG. 10 is an isometric illustration in exploded view of the modified blade member as employed in FIG. 9.

A further modified blade insert 30 is indicated in the FIGS. 9 and 10, wherein the blade insert 30 includes a beveled cutting blade 31 extending from a first orientation colinear with the blade first side wall 17 to the support flange second side wall 23.

The FIGS. 11-13 indicate a compound blade insert 32 having an insert top wall 33, including an insert bottom wall 34 spaced from the top wall 33. A first cutting edge 35 is mounted to a first side of the compound blade insert 32, with an insert second side wall 38, including an arcuate second cutting edge 37 extending from the first cutting edge 35 and canting upwardly, having a beveled top surface extending beyond the insert top wall 33 terminating in an abutment wall 40 arranged to engage and receive the support flange end wall 41. The arcuate cutting edge 37 includes a concave relief blade top surface 39 permitting greater ease of discharge of grass components during a cutting procedure. An abutment wall 40 is of a generally L-shaped configuration to not only engage the support flange end wall 41 but to further accommodate the support flange second side wall 23, wherein cooperation with the fasteners 36 secures the compound blade insert 32 in a secure orientation relative to the blade plate 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn mower blade and insert construction, comprising, an elongate blade plate having a blade first end wall spaced from a blade second end wall, and a blade top wall spaced from a blade bottom wall, with the blade plate having a mounting bore directed through the blade plate extending from the blade top wall through the blade bottom wall and oriented between the blade first end wall and the blade second end wall, the blade plate further including a blade first side wall spaced from a blade second side wall, and an individual support flange extending from said blade first end wall and said blade second end wall, with each support flange having a support flange top wall coplanar with the blade top wall, and a support flange bottom wall spaced from the blade bottom wall, and a support flange first side wall coplanar with a predetermined side wall of either said blade first side wall or said blade second side wall, and the support flange further including a support flange second side wall orthogonally intersecting a respective end wall of said blade plate first end wall and said blade plate second end wall, and at least one blade insert secured to said support flange in contiguous communication to said first end wall, wherein said at least one blade insert includes a blade cutting edge oriented in adjacency to said blade first side wall, and said at least one blade includes a plurality of mounting fasteners directed through said support flange and through said at least one blade insert, wherein said at least one blade insert extends from said support flange bottom wall to said blade bottom wall in a coplanar relationship, and a further blade insert secured to said support flange in contiguous communication to said second end wall.

2. A lawn mower blade and insert construction as set forth in claim 1 wherein the at least one insert includes an insert blade, and the insert blade projects beyond the blade first side wall.

* * * * *